US008760592B2

United States Patent
Toko (10) Patent No.: US 8,760,592 B2
(45) Date of Patent: Jun. 24, 2014

(54) LIGHT DEFLECTING APPARATUS

(75) Inventor: Yasuo Toko, Yokohama (JP)

(73) Assignee: Stanley Electric Co., Ltd., Tokyo (JP)

( * ) Notice: Subject to any disclaimer, the term of this patent is extended or adjusted under 35 U.S.C. 154(b) by 549 days.

(21) Appl. No.: 13/071,614

(22) Filed: Mar. 25, 2011

(65) Prior Publication Data

US 2011/0234572 A1    Sep. 29, 2011

(30) Foreign Application Priority Data

Mar. 26, 2010   (JP) ................................. 2010-071496

(51) Int. Cl.
*G02F 1/1335*   (2006.01)
*G02F 1/13*   (2006.01)

(52) U.S. Cl.
USPC .................. 349/13; 349/12; 349/15; 349/16; 349/198

(58) Field of Classification Search
CPC ............................................. G02F 2001/13793
See application file for complete search history.

(56) References Cited

U.S. PATENT DOCUMENTS

| 5,654,749 | A | 8/1997 | Kanno | |
|---|---|---|---|---|
| 2005/0018095 | A1* | 1/2005 | Kim | 349/13 |
| 2006/0227283 | A1* | 10/2006 | Ooi et al. | 349/201 |
| 2009/0161364 | A1* | 6/2009 | Bremerich et al. | 362/268 |
| 2010/0027294 | A1* | 2/2010 | Lee et al. | 362/620 |

FOREIGN PATENT DOCUMENTS

| JP | 06-178325 A | 6/1994 |
|---|---|---|
| JP | 2003-327966 A | 11/2003 |

OTHER PUBLICATIONS

Kikuchi & Okumura Lab. of Institute for Materials Chemistry and Engineering, Kyusyu University Division of Integrated Materials, "Bluephase" (http://kikuchi-lab.cm.kyushu-u.ac.jp/kikuchilab/bluephase.html), retrieved Feb. 1, 2011, with partial translation of the figures. Only English language portions considered.

* cited by examiner

*Primary Examiner* — Bumsuk Won
*Assistant Examiner* — Angela Davison
(74) *Attorney, Agent, or Firm* — Holtz Holtz Goodman & Chick PC

(57) ABSTRACT

A light deflecting apparatus includes first and second light deflecting liquid crystal cells, each corresponding to each eye of a user and each comprising a liquid crystal layer including liquid crystal molecules with positive dielectric anisotropy and exhibiting a cholesteric blue phase when no voltage is applied, a pair of transparent substrates sandwiching the liquid crystal layer, a pair of transparent electrodes each being formed above each transparent substrate, a prism layer formed above one of the transparent substrates, and a driving device switching between a first state wherein the first and the second light deflecting liquid crystal cells are respectively in a homeotropic phase and a cholesteric blue phase, and a second state wherein the first and the second light deflecting liquid crystal cells are respectively in a cholesteric blue phase and a homeotropic phase.

16 Claims, 7 Drawing Sheets

LIGHT DEFLECTING APPARATUS

CROSS-REFERENCE TO RELATED APPLICATION

This application is based upon and claims the benefit of priority of the prior Japanese Patent Application No. 2010-071496, filed on Mar. 26, 2010, the entire contents of which are incorporated herein by reference.

BACKGROUND OF THE INVENTION

A) Field of the Invention

This invention relates to a light deflecting apparatus which deflects a direction of light by using a liquid crystal device.

B) Description of the Related Art

Glasses using liquid crystal shutters for watching three-dimensional images have been suggested (for example, refer to JPA H6-178325). This kind of glasses for three-dimensional imaging (hereinafter the 3D glasses) makes light on a left eye side pass through it but shades light on a right eye side when displaying images for a left eye for three-dimensional images, whereas it makes light on a right eye side pass through it but shades light on a left eye side when displaying images for a right eye for three-dimensional images. The crystal liquid shutter used in that kind of 3D glasses uses a polarizer so that optical transmittance is hardly improved. A novel technique for optical devices which can be applied to 3D glasses is desired.

Recently researches on a cholesteric blue phase for liquid crystal material have been carried out, and a technique for enlarging an appearance temperature range of a cholesteric blue phase by a polymer stabilization process has been suggested (for example, refer to JPA 2003-327966).

SUMMARY OF THE INVENTION

It is an object of the present invention to provide a light deflecting apparatus which can be used for watching three-dimensional images by using a liquid crystal device with a novel structure.

According to one aspect of the present invention, there is provided a light deflecting apparatus, including: first and second light deflecting liquid crystal cells, each corresponding to each eye of a user and each comprising a liquid crystal layer including liquid crystal molecules with positive dielectric anisotropy and exhibiting a cholesteric blue phase when no voltage is applied, a pair of transparent substrates facing each other and sandwiching the liquid crystal layer, a pair of transparent electrodes each being formed above a surface of each transparent substrate facing the liquid crystal layer and applying a voltage to the liquid crystal layer, a prism layer formed above the surface of one of the transparent substrates facing the liquid crystal layer; and a driving device that performs a first control for alternately switching between a first state wherein a first high voltage is applied to the first light deflecting liquid crystal cell for letting the first light deflecting liquid crystal cell be in a homeotropic phase while a second low voltage is applied to the second light deflecting liquid crystal cell for letting the second light deflecting liquid crystal cell be in a cholesteric blue phase and a second state wherein a third low voltage is applied to the first light deflecting liquid crystal cell for letting the first light deflecting liquid crystal cell be in a cholesteric blue phase while a fourth high voltage is applied to the second light deflecting liquid crystal cell for letting the second light deflecting liquid crystal cell be in a homeotropic phase.

DETAILED DESCRIPTION OF THE PREFERRED EMBODIMENTS

First, a structure and a fabrication method of a light deflecting liquid crystal cell according to a first embodiment of the present invention are explained.

Figure 1:
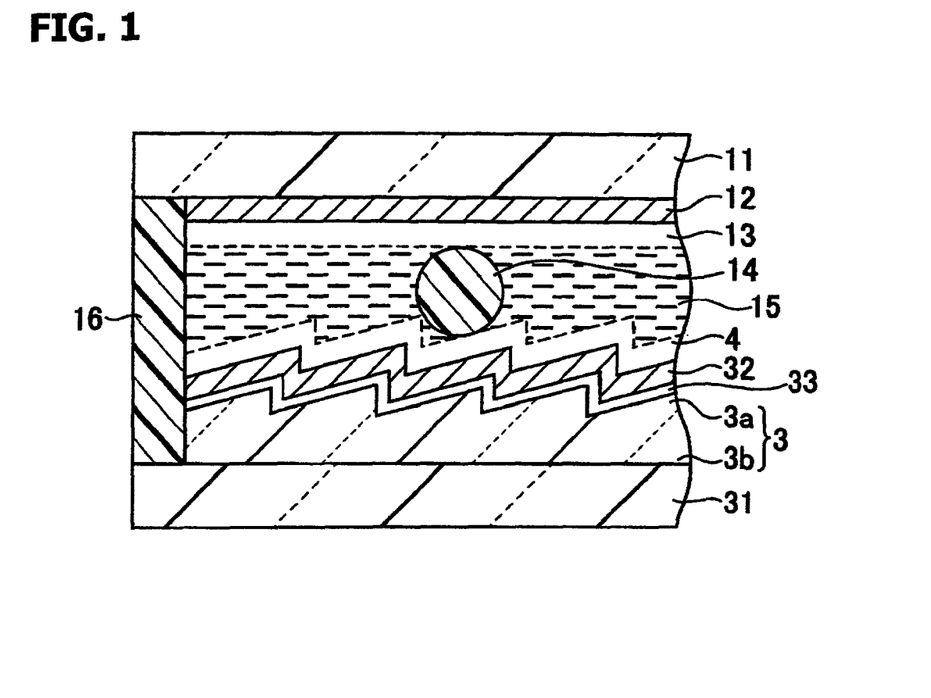
FIG. 1 is a schematic cross sectional view in a thickness direction of a light deflecting liquid crystal cell according to a first embodiment (and a second embodiment).

FIG. 1 is a schematic cross sectional view in a thickness direction of a light deflecting liquid crystal cell according to a first embodiment. A pair of glass substrates 11 and 31 is prepared. A thickness of each of the glass substrates 11 and 31 is, for example, 0.7 mmt.

A transparent electrode 12 is formed on the glass substrate 11. The transparent electrode 12 is, for example, formed of indium tin oxide (ITO) and has a thickness of 150 nm. The ITO electrode 12 can be patterned into a desired plane shape by wet etching using ferric chloride or by laser abrasion which removes unnecessary parts of the ITO film by laser.

A prism layer 3 is formed on another glass substrate 31 on which a transparent electrode is not formed. The prism layer 3 has a shape wherein prisms 3a are aligned on a base layer 3b. A thickness of the base layer 3b is about 2 μm~30 μm.

Figure 2A:
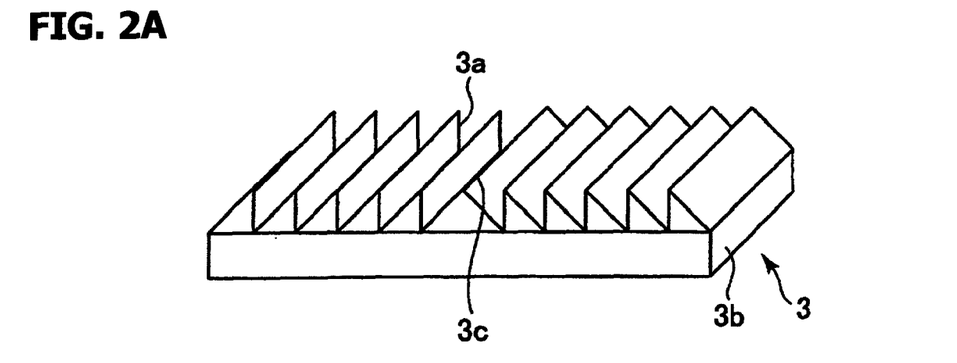
FIG. 2A is a schematic perspective view of the prism layer 3.
Figure 2B:
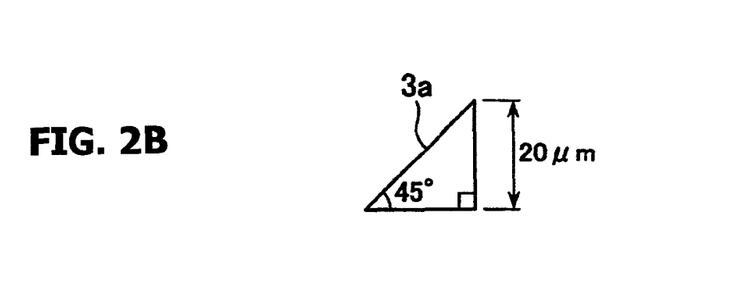
FIG. 2B is a cross sectional view of the prism 3a according to the first embodiment.

FIG. 2A is a schematic perspective view of the prism layer 3, and FIG. 2B is a cross sectional view (perpendicular to a length direction) of the prism 3a. Each prism 3a is in a shape of a triangular prism having an apex angle of about 45 degrees and base angles of about 45 degrees and about 90 degrees. A plurality of the prisms 3a are aligned in a direction (hereinafter the prism width direction) orthogonal to a direction in which the prisms 3a extend (hereinafter the prism length direction). A height of the prism 3a is about 20 μm, and length of the base (a pitch) of the prism 3a is about 20 μm.

Figure 3:
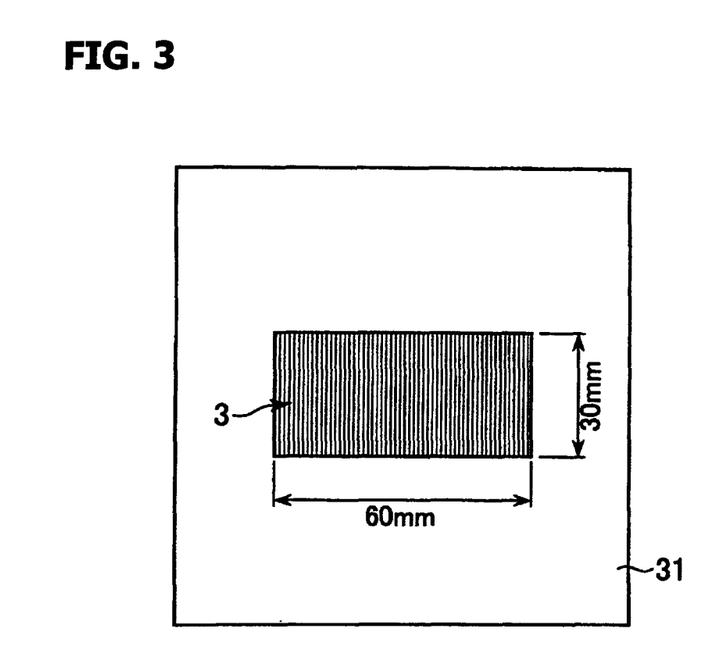
FIG. 3 is a schematic plan view of the prism layer 3 formed on the glass substrate according to the first embodiment.

The prism layer 3 has a line-symmetrical (left-right symmetrical) shape with respect to a center axis 3c in a plan view. The prism 3a on the right side of the center axis 3c has a right slanted surface, and the prism 3a on the left side of the center axis 3c has a left slanted surface. The right slanted surface of the prism 3a on the right side of the center axis 3c and the left slanted surface of the prism 3a on the left side of the center axis 3c are contacted at the center axis 3c and form a ridge.

Preferred material for the prism layer 3 is explained. In a later executed process of baking main sealant of a liquid crystal cell, a thermal treatment at about no less than 150 degrees Celsius is performed. Moreover, in a later executed process of forming a transparent electrode on the prism layer 3, a thermal treatment at about no less than 180 degrees Celsius is performed for forming the transparent electrode with high transparency (with low resistance). A thermal treatment at about no less than 160 degrees Celsius is performed for baking a vertical alignment film although it is not formed in this embodiment. Therefore, it is preferable to use prism material whose properties (e.g., transmittance) are not greatly changed by a heat treatment process over 150 degrees Celsius.

The inventor of the present invention has performed experiments for evaluating differences in transmittances of a plurality of materials for forming a prism layer before and after a heat treatment process (two hours at 220 degrees Celsius). As a result, ultraviolet ray (UV) curable acrylic resins showed the same transmittances before and after the heat treatment process almost all over the visible wavelength range although the transmittance after the heat treatment process was very slightly lowered at short wavelength side, and so it was found that properties (e.g., transmittance) are not greatly changed by using the UV curable acrylic resins. In this specification, a condition that properties are not greatly changed means a condition wherein change in the properties in a visible light range (wavelength 380 nm-780 nm) after the heat treatment process is about not over 2%.

The UV curable acrylic resins has not only heat resisting property but also has a property of good adherence to glass and good releasing ability to metal; therefore, it is preferable to use the UV curable acrylic resins as material for forming a prism layer according to the embodiments of the present invention. Moreover, epoxy resins have good heat resisting property and can be also used as material for forming a prism layer according to the embodiments of the present invention. Furthermore, polyimide can be used as material for forming a prism layer according to the embodiments of the present invention.

FIG. 3 is a schematic plan view of the prism layer 3 on the glass substrate 31. A method for manufacturing the prism layer 3 is explained. The UV curable acryl resins are dropped on the glass substrate 31, a metallic mold having a shape of the prism layer 3 is placed on a predetermined position of the glass substrate 31, and a pressing process is performed with reinforcing a back of the glass substrate 31 with a thick quarts material, etc. A formation region of the prism layer 3 is, for example, 60 mm in width and 30 mm in length. Moreover, an amount of dropping the UV curable resin can be adjusted in correspondence with the area of the prism formation region.

After pressing for no less than a minute to sufficiently spread the UV curable resin over the prism formation region, UV rays are irradiated from the back of the glass substrate 31 to harden the UV curable resin. An irradiation amount of the UV rays is, for example, 20 J/cm$^2$. The irradiation amount of the UV rays can be set arbitrary as far as it is sufficient to harden the resin. Moreover, tiny grooves for evacuating air can be formed in the metallic mold for forming the prism. Further, the metallic mold and the substrate can be put together in a vacuum.

Next, the glass substrate 31 with the prism layer 3 is washed by a washer. For example, brushing using alkali detergent, pure water washing, air blowing, UV irradiation and infrared ray (IR) drying can be sequentially performed. A Washing method is not limited to the above, but high-pressure spray washing, plasma washing, etc. can be used.

Referring to FIG. 1 again, the explanation is continued. For example, an ITO transparent electrode 32 is further formed above the prism layer 3. The transparent electrode 32 can be formed directly on the prism layer 3; however, it may be formed on an SiO$_2$ film 33 for improving adhesiveness. The SiO$_2$ film 33, for example, is formed with a thickness of 50 nm by sputtering (alternating-current discharge) at a substrate temperature of 80 degrees Celsius.

Next an ITO film 32, for example, with a thickness of 100 nm is formed on the SiO$_2$ film 33 by sputtering (alternating-current discharge) at a substrate temperature of 100 degrees Celsius to form the transparent electrode 32. The ITO film can be formed selectively on desired regions by masking unnecessary part with a SUS mask, a high-temperature resistant tape, etc. After forming the ITO film, it is baked, for example, for an hour at 220 degrees Celsius for improving transparency and conductivity of the ITO film.

Further, as the film forming method, vacuum vapor deposition, an ion-beam method, chemical vapor deposition (CVD), etc. can be used. In this case, it is preferred to bake the ITO film, for example, for about an hour and at 220 degrees Celsius for improving its transparency and conductivity.

Next, the glass substrates 11 and 31 are washed by a washer. For example, brushing by using alkali detergent, pure water washing, air blowing, UV irradiation and infrared ray (IR) drying can be sequentially performed. A washing method is not limited to the above, but high-pressure spray washing, plasma washing, etc. can be used.

Next, a main sealant 16 containing, for example, 2 wt % to 5 wt % of gap controllers, is formed on the glass substrate 31. Screen printing or a dispenser can be used for forming the main sealant. The gap controller is selected so that a thickness of the liquid crystal layer 15 including height of prism 3a (a height from the base layer 3b of the prism) is, for example, 10 μm to 35 μm. For example, 4 wt % of plastic balls manufactured by Sekisui Chemical CO., LTD with a diameter of 45 μm as the gap controller are added to the sealant ES-7500 manufactured by Sekisui Chemical CO., LTD to make the main sealant 16.

Plastics ball manufactured by Sekisui Chemical CO., LTD., for example, with a diameter of 21 μm as the gap controller 14 are sprayed onto the another glass substrate 11 by using a dry-type spacer spraying device.

Next, both glass substrates 11 and 31 are assembled together, and a vacant cell is formed by hardening the main sealant 16 by a thermal process with applying a predetermined pressure by a pressing machine and the like. For example, the thermal process is performed for three hours at 150 degrees Celsius.

Moreover, depending on necessity, a vertical alignment film 4 can be formed on the transparent electrode 32 and a vertical alignment film 13 can be formed on the transparent electrode 12. The vertical alignment films are formed, for example, of polyimide by flexo-printing and baked, for example, at 180 degrees Celsius.

Next, the vacant cell is filled with the liquid crystal material by vacuum filling to form the liquid crystal layer 15. After filling the liquid crystal material, end sealant is applied to a liquid crystal inlet to seal the liquid crystal cell. A method for forming the liquid crystal layer is not limited to the vacuum filling, but for example, a one drop fill (ODF) method can be used.

For forming the liquid crystal layer 15, material including liquid crystal molecules with positive dielectric anisotropy and exhibiting a cholesteric blue phase (or a blue phase) when no voltage is applied (in a predetermined range of temperatures) is used.

The liquid crystal material described in the below is used in the first embodiment. Mixed liquid crystal containing a 1:1 mixture of fluorinated mixed liquid crystals JC1041-XX (manufactured by Chisso corporation, $\Delta n$:0.142) and 4-cyano-4'-pentylbiphenyl (5CB) (manufactured by Merck Ltd., $\Delta n$:0.184) is used, and 5.6% of chiral agent ZLI-4572 (manufactured by Merck Ltd.) is added to the above-described mixed liquid crystal material.

Then, a mixed monomer which is mixture of mono-functional material and bi-functional material is added as a photopolymerization monomer. For example, 2-ethylhexylacrylate (EHA) (manufactured by Sigma-Aldrich Corporation) as the mono-functional material and RM257 (manufactured by Merck Ltd.) as the bi-functional material are mixed with a mole ratio of 70:30.

Further, 2,2-dimethoxy-2-phenylacetophenone (DMPDP) is used as a photopolymerization initiator and added to the mixed monomer by 5 mol %.

8 mol % of the photopolymerization mixed monomer added with the photopolymerization initiator is added to the mixed liquid crystal added with the chiral agent. As described in the above, the liquid crystal material which forms the liquid crystal layer 15 is prepared. Moreover, the liquid crystal, the chiral agent, the photopolymerization monomer and the photopolymerization initiator are not limited to the above. However, it is preferable for preparing the photopolymerization monomer to mix the mono-functional monomer and the bi-functional monomer is used.

When the liquid crystal cell formed as in the above is heated, a blue phase is exhibited in a narrow temperature range around 60 degrees Celsius. The blue phase can be polymer-stabilized by irradiating ultraviolet rays to the liquid crystal cell to form a polymer network by polymerizing the photopolymerization monomer while keeping the temperature exhibiting the blue phase.

For example, ultraviolet rays are irradiated as in the below. First of all, intermittent irradiation wherein a sequence of irradiation of ultraviolet rays for one second and non-irradiation of ultraviolet rays for ten seconds is repeated for ten times is performed. After the intermittent irradiation, continuous irradiation is performed for three minutes. Intensity of ultraviolet rays is, for example, 30 mW/cm$^2$ (365 nm). Further, a condition of exposure is not limited to the above, for example, intensity of ultraviolet rays can be lowered (although the photopolymerization will take longer).

The polymer-stabilized liquid crystal cell exhibits the blue phase in a wide temperature range from –5 degrees Celsius to 60 degrees Celsius. Further, the temperature range exhibiting the blue phase after the polymer stabilization process can be widened by selecting liquid crystal material to be used and adjusting its mixing ratio, condition of the photopolymerization, etc.

As described in the above, the light deflecting liquid crystal cell according to the first embodiment is fabricated. Next, an operation of the light deflecting liquid crystal cell according to the first embodiment is explained.

The light deflecting liquid crystal cell according to the embodiment exhibits a blue phase when no voltage is applied.

The blue phase is optically isotropic and there are three types of blue phases: a blue phase I having body-centered cubic symmetry; a blue phase II having simple cubic symmetry; and a blue phase III having isotropic symmetry. The blue phase I is exhibited at the lowest temperature of the three and the blue phase III is exhibited at the highest temperature of the three. The light deflecting liquid crystal cell according to the embodiment uses the blue phase I.

Figure 4:
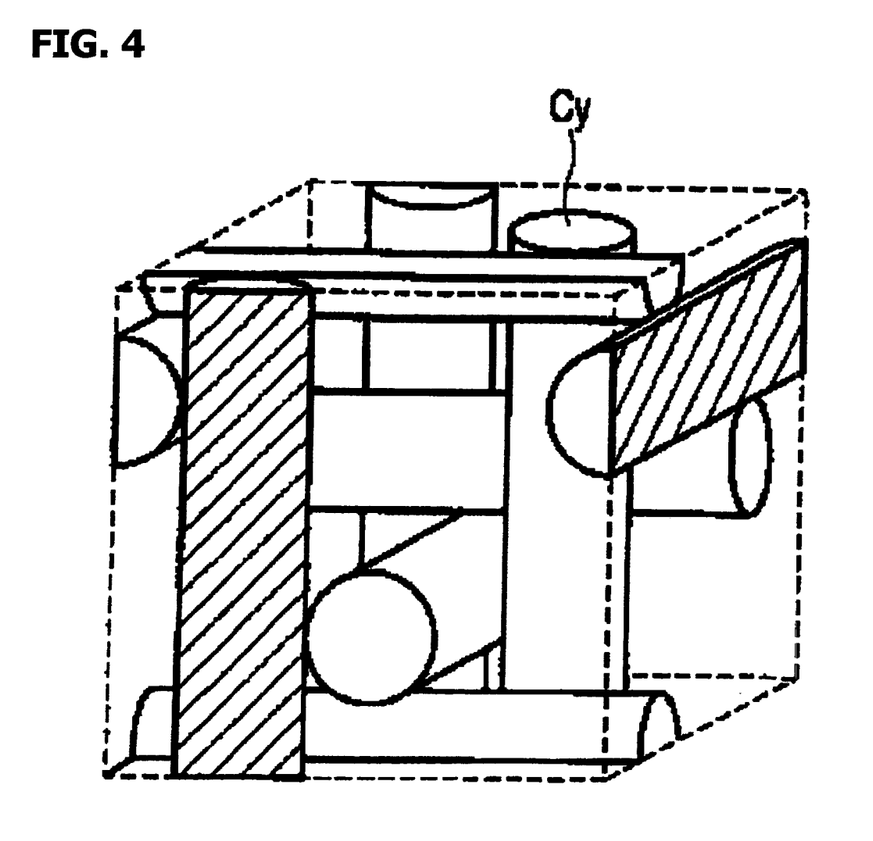
FIG. 4 is a schematic view of a structure of a blue phase (blue phase I).

FIG. 4 is a schematic perspective view showing a structure of the blue phase I (according to the above-mentioned homepage). In the blue phase, double-twisted cylinders Cy which are aggregations of liquid crystal molecules allowed to be twisted in all lateral directions around the center are arranged in a cubic lattice by crossing with each another at a right angle is formed.

Because the blue phase is optically isotropic, the refractive index of the liquid crystal layer viewed from a direction perpendicular to the substrate of the light deflecting liquid crystal cell according to the embodiment is an average value $(2no+ne)/3$ of the ordinary ray refractive index no and the extraordinary ray refractive index ne of the liquid crystal material, and the refractive indices become the same for both polarization components of the incident ray (a ray of light forwarding to a direction perpendicular to the substrate) which are perpendicular to each other.

On the other hand, in the light deflecting liquid crystal cell according to the embodiment, a voltage is applied in a direction of a thickness of the liquid crystal layer when voltage is applied; therefore, the twisted structure of the liquid crystal molecules in the blue phase is cancelled by the positive dielectric anisotropy and almost all the liquid crystal molecules rise in the direction vertical to the substrate to exhibit a homeotropic phase.

In the homeotropic phase, the refractive index of the liquid crystal layer viewed from the direction perpendicular to the substrate is the ordinary ray refractive index no, and the refractive indices become the same for both polarization components of the incident ray (a ray of light forwarding to a direction perpendicular to the substrate) which are perpendicular to each other.

In the embodiment of the present invention, the refractive index no of the ordinary ray of the liquid crystal material is 1.521, and the refractive index ne of the extraordinary ray is 1.683. Therefore, not depending on the polarization direction, the refractive index of the liquid crystal layer to the incident ray is estimated to be about 1.574 in the blue phase when no voltage is applied and 1.521 in the homeotropic phase when a voltage is applied. The refractive index of the prism material is 1.51.

As described in the above, the incident ray to the light deflecting liquid crystal cell according to the first embodiment is deflected by the function of the prism because the refractive index of the liquid crystal layer differs from the refractive index of the prism layer when no voltage is applied and exhibiting the blue phase. The direction of the deflection of the ray by the prism having right-slanted surface and the direction of the deflection of the ray by the prism having the left slanted surface are opposed to each other. On the other hand, when a voltage is applied and exhibiting the homeotropic phase, the refractive indices of the liquid crystal layer and the prism layer become substantially equal, and the incident ray goes almost straight not depending on the directions of the slanted surface. These functions do not depend on the polarization direction of the incident ray.

In this specification, when the difference between the refractive index of the first member and the refractive index of the second member is not larger than 2% (preferably not larger than 1%) of the refractive index of the first member or the refractive index of the second member, the refractive indices of both members are considered as substantially equal.

Further, a combination of the materials wherein the refractive indices of the liquid crystal layer and the prism layer are substantially equal in the blue phase, and the refractive indices of the liquid crystal layer and the prism layer are different in the homeotropic phase can be considered.

A light deflecting apparatus is fabricated by assembling the light deflecting liquid crystal cell according to the first embodiment (although the prism layer with the prisms slanted in one direction with the different apex angles from the above-described example is used) and the light source. Incident ray to this light deflecting liquid crystal cell deflected in one direction because the slanted surfaces of the prisms are slanted in one direction.

A gap between the polarization components has not been observed in projection images of this light deflecting apparatus, and it has been found that the light deflecting liquid crystal cell deflects both polarization components of the incident ray similarly.

Further, it has been found that the direction of the ray can be continuously changed from a state wherein the ray is deflected by the prism to a state wherein the ray goes straight by changing the applied voltage from 0V to a sufficiently high voltage (about 50V).

It is considered that the refractive index continuously changes from the refractive index in the blue phase when no voltage is applied to the refractive index in the homeotropic phase by increasing the applied voltage. When the liquid crystal layer exhibits the homeotropic phase by applying the sufficiently high voltage (that is, all the liquid crystal molecules rise in the direction perpendicular to the substrate), the refractive index will not change any more even if the applied voltage is further raised, and the light direction will not change either.

Moreover, it has been found that response speed is fast by measuring the response speeds of a rising edge and a falling edge of the liquid crystal molecules at a room temperature. The response speed at the rising edge to exhibit the homeotropic phase was about 400 μsec, and the response speed at the falling edge to exhibit the blue phase was about 250 μsec.

In the light deflecting liquid crystal cell according to the embodiment, the transparent electrode is formed on the prism layer of the substrate with the prism layer side. The light deflecting liquid crystal cell having the prism-layer-side transparent electrode formed on the substrate, the prism layer formed on the transparent electrode wherein a voltage is applied to the liquid crystal layer via the prism layer also can deflect ray of light. However, a driving voltage can be reduced when the transparent electrode is formed on the prism layer.

Next, a pair of glasses for watching a three-dimensional images (hereinafter, called the 3D glasses) according to the first application example of the light deflecting liquid crystal cell according to the first embodiment is explained. A size, a plane shape, angles of the slanted surfaces of the prisms, etc. of the light deflecting liquid crystal cell can be adjusted depending on necessity.

Figure 5:
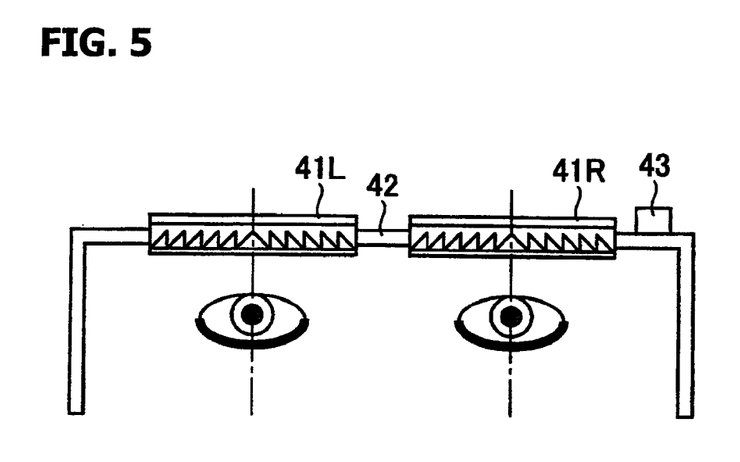
FIG. 5 is a cross sectional view in a horizontal direction schematically showing 3D glasses according to the first (and the second) application examples.

FIG. 5 is a cross sectional view in a horizontal direction schematically showing the 3D glasses according to the application example. The 3D glasses include a light deflecting liquid crystal cell for a left eye (left eye cell) 41L and a light deflecting liquid crystal cell for a right eye (right eye cell) 41R. The left eye and right eye cells 41L and 41R are set in a frame 42 for fitting over ears of a watcher with the prism direction (the longitudinal direction of the prism) being vertical.

It is preferable to set each of the cells 41L and 41R in the frame 42 to match the center axes (of left and right symmetry) of the prism layer with the center (pupil) of the left eye and the right eye of a watcher of three-dimensional images (a user). The 3D glasses are equipped with a driver (driving device) 43 for controlling both of the cells 41L and 41R in synchronization with image signals for three-dimensional images. The driver 43 can apply alternating-current voltage (for example, frequency of about 1 kHz) while changing voltages.

Figure 6A:
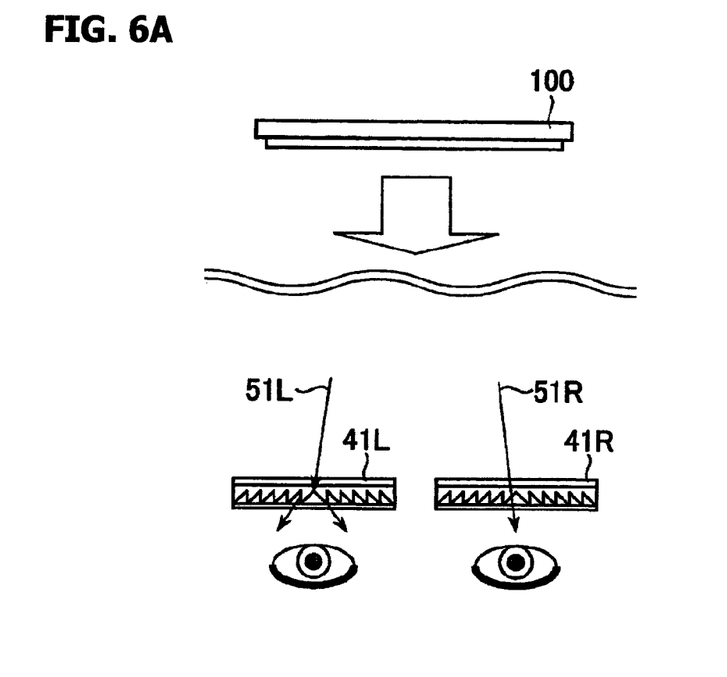
FIG. 6A and FIG. 6B are schematic ray diagrams of rays from a display in condition that an image for a right eye and an image for a left eye of three-dimensional images are displayed respectively.
Figure 6B:
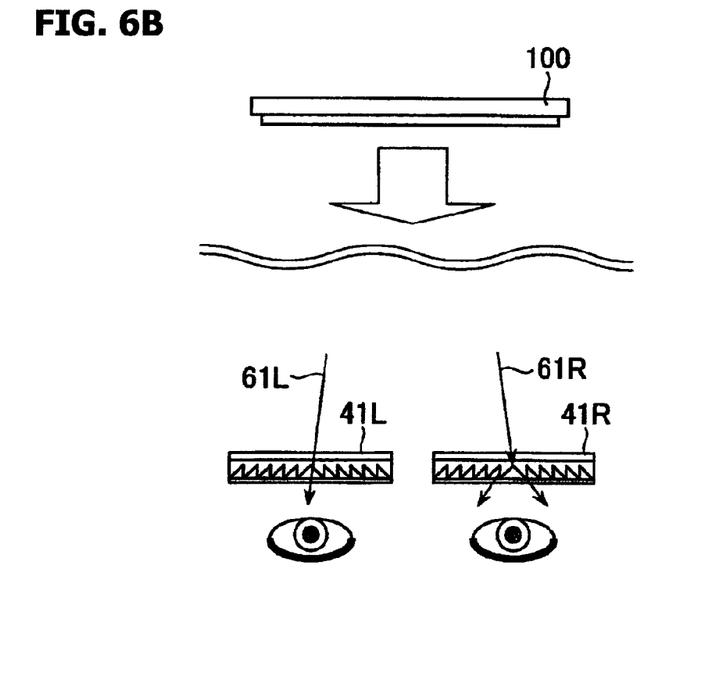
Figure 7A:
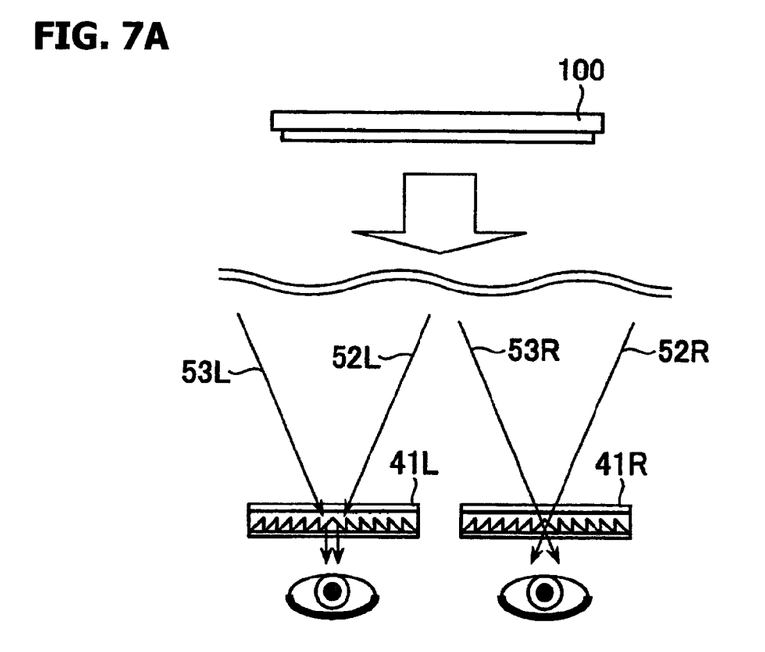
FIG. 7A and FIG. 7B are schematic ray diagrams of rays from circumference of a display in condition that an image for a right eye and an image for a left eye of three-dimensional images are displayed respectively.
Figure 7B:
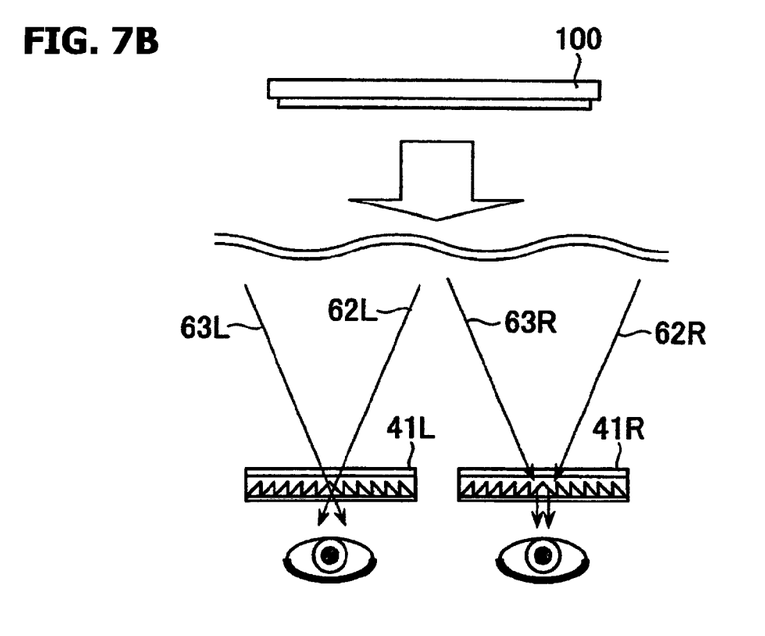

The operation of the 3D glasses according to the application example is explained with reference to FIG. 6A to FIG. 7B. FIG. 6A and FIG. 7A are schematic ray diagrams showing states wherein images for the right eye of three-dimensional images are displayed on a display 100. FIG. 6B and FIG. 7B are schematic ray diagrams showing states wherein images for the left eye of the three-dimensional images are displayed on the display 100. In this specification, a reproducing device for reproducing the three-dimensional image (video) signals is included in the display.

The images for the right eye and the images for the left eye are alternately displayed on the display 100 at, for example, a frequency of 120 Hz or 240 Hz. For example, the displays of the right and the left are switched by about 8.3 msec at the frequency of 120 Hz or by about 4.2 msec at the frequency of 240 Hz.

As shown in FIG. 6A, a high voltage for the liquid crystal layer to exhibit the homeotropic phase is applied to the right eye cell 41R at the state wherein the image for the right eye is displayed, and a ray 51R from the display 100 to the right eye passes through (without deflection by the prisms) the right eye cell 41R. By that, the right eye can see the image for the right eye.

At a meantime, a low voltage (including 0V) to keep the liquid crystal layer exhibit the blue phase is applied to the left eye cell 41L, and a ray 51L from the display 100 to the left eye is deflected by the prisms of the left eye cell 41L. In this example, the ray 51L is deflected to the right side by the prisms on the right side of the center axis and to the left side by the prisms on the left side of the center axis. By that, the image for the right eye is out of sight and the left eye cannot see the image for the right eye.

As shown in FIG. 7A, a ray 52L from the right background outside the display 100 to a vicinity of the left eye is deflected by the prisms on the right side of the left eye cell 41L and enters to the left eye. At the same time, a ray 53L from the left background outside the display 100 to the vicinity of the left eye is deflected by the prisms on the left side of the left eye cell 41L and enters to the left eye. By that, the left eye sees overlapping images of the left and the right backgrounds outside the display 100 when the image for the right eye is displayed.

Moreover, the right eye will not see the left and the right backgrounds outside the display 100 because a ray 52R from the right background outside the display 100 to a vicinity of the right eye and a ray 53R from the left background outside the display 100 to the vicinity of the right eye are not deflected by the prisms of the right eye cell 41R.

When watching in a dark room or when periphery of the display 100 is dark, the left eye sees meaningless dark background. Even if the periphery of the display 100 is blight, the left eye sees an unclear view with the overlapped left and right backgrounds outside the display 100. Because the images entering to the left eye is noisy view at the state wherein the image for the right eye is displayed, the watcher can concentrate on the image seen by the right eye. It is more preferable to watch while making the periphery of the display dark.

On the other hand, as shown in FIG. 6B and FIG. 7B, a high voltage for the liquid crystal layer to exhibit the homeotropic phase is applied to the left eye cell 41L in the state wherein the image for the left eye is displayed, whereas a low voltage to keep the liquid crystal layer exhibit the blue phase is applied to the right eye cell 41R.

A ray 61L from the display 100 to the left eye passes through the left eye cell 41L, and the left eye can see the image for the left eye. A ray 61R from the display 100 to the right eye is deflected by the prisms in right and left of the right eye cell 41R, and the right eye will not see the image for the left eye. The rays 62R and 63R from the right and left background outside the display 100 to the vicinity of the right eye are deflected by the prisms on the right and left of the right eye cell 41R and enter into the right eye. The right eye sees a noisy view with the overlapped left and right backgrounds outside the display. The watcher can concentrate on the image seen by the left eye.

Moreover, the left eye will not see the left and the right backgrounds outside the display 100 because a ray 62L from the right background outside the display 100 to a vicinity of the right eye and a ray 63L from the left background outside the display 100 to the vicinity of the right eye are not deflected by the prisms of the left eye cell 41L.

The watcher can watch the three-dimensional images by switching the state wherein the right eye can see the image for the right eye and the state wherein the left eye can see the image for the left eye alternately.

Furthermore, the voltage applied to the light deflecting liquid crystal cell on a side to which the 3D image is not shown (the side to which the low voltage is applied) can be changed time-dependently (for example, by a frame or within a frame) in a range of the low voltage which can keep the liquid crystal layer exhibit the blue phase.

As described in the above, the deflecting angles by the light deflecting liquid crystal cell can be changed by the changing the applied voltage. For example, the background seen by the eye to which the 3D image is not shown varies frame by frame by changing the applied voltage by a frame. By that, it will be harder for the watcher to recognize the backgrounds as meaningful images.

Further, the voltage applied to the light deflecting liquid crystal cell on a side to which the 3D image is shown (the side to which the high voltage is applied) can be fixed to make the liquid crystal layer exhibit the homeotropic phase.

Moreover, when the three-dimensional image is not watched, almost normal vision can be obtained by applying the high voltage to both cells to exhibit the homeotropic phase. Therefore, two-dimension images can be watched without any change.

Furthermore, because the light deflecting liquid crystal cell according to the embodiment does not use a polarizer, a high optical transmittance (for example, 90 percent or more when using a reflection prevention film) can be obtained. For example, uncomfortable feeling of darkness is not felt when acting with the 3D glasses on with applying the high voltage to both cells.

Furthermore, as described in the above, the response speed at the rising edge of the light deflecting liquid crystal cell according to the embodiment is fast in order of several hundreds μsec (for example, 400 μsec), and the response speed at the falling edge is in several hundreds μsec (for example, 250 μsec). Therefore, the light deflecting liquid crystal cell can be driven with sufficient margin for displaying the three-dimensional image at a frequency higher than 240 Hz.

Although the example wherein the ray from the display is deflected to the right and the left directions to the eye to which the 3D image is not shown has been explained, the ray can be deflected to up and down directions setting the prism direction of the light deflecting liquid crystal cell to be horizontal. In this case, overlapped up and down backgrounds outside the display are seen by the eye to which the 3D image is not shown.

Although the example of deflecting the ray to the left and right directions by the prisms in a line-symmetric shape has been explained, it is possible to use prisms which deflects rays in one direction (for example, prisms of which slanted surfaces are slanted in one direction) in terms of deflecting images for not to be seen by the eye by which the images are not expected to be seen and entering background to the eye by which the images are not expected to be seen. For example, this structure is effective when watching in a dark room.

In each of the first and second light deflecting liquid crystal cells, the liquid crystal layer can be switched from the cholesteric blue phase to the homeotropic phase by applying the voltage, the refractive index can be changed, and directions of the light deflection by the prisms can be changed.

By alternately switching between the first state wherein the first light deflecting crystal cell is in the homeotropic phase whereas the second light deflecting crystal cell is in the cholesteric blue phase and the second state wherein the first light deflecting crystal cell is in the cholesteric blue phase whereas the second light deflecting crystal cell is in the homeotropic phase, it can be switched alternately between the state wherein one eye of a user can see three-dimensional image whereas another eye cannot see the image and the state wherein one eye of the user cannot see the image whereas another eye can see the image.

Next, the light deflecting liquid crystal cell according to the second embodiment is explained. The difference from the first embodiment is the shape of the prism. Further, as the liquid crystal material forming the liquid crystal layer, a different example from the first embodiment is mentioned. Other structures are the same as the first embodiment.

Figure 8A:
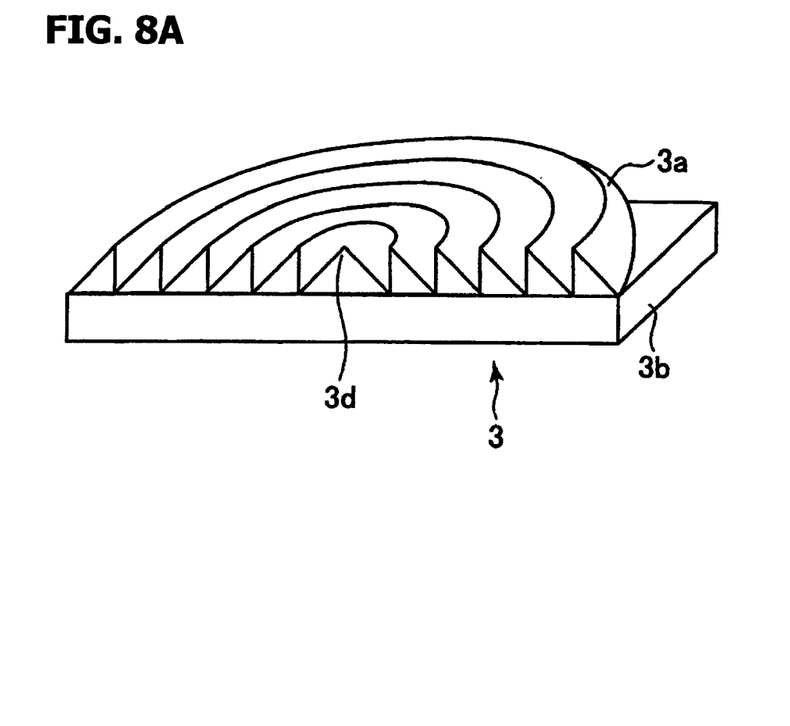
FIG. 8A is a schematic perspective view of a prism layer according to the second embodiment.
Figure 8B:
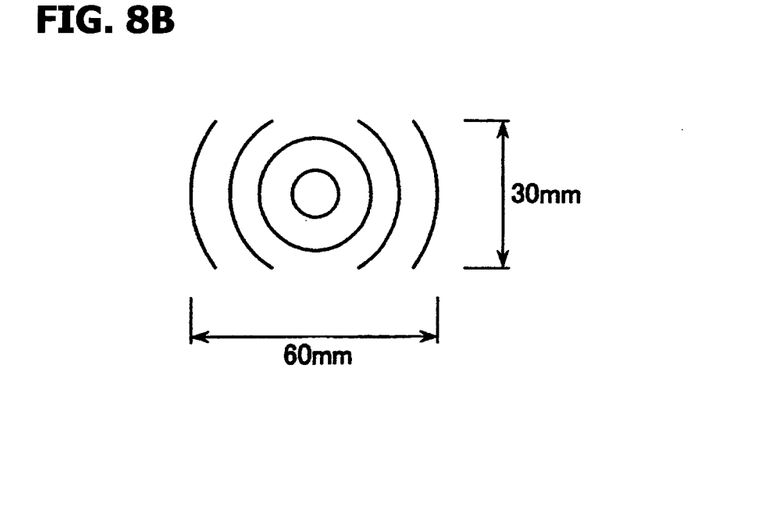
FIG. 8B is a schematic plan view of the prism layer according to the second embodiment.

FIG. 8A is the schematic perspective view of the prism layer 3 of the light deflecting liquid crystal cell according to the second embodiment. FIG. 8B is the schematic front view of the prism layer 3 of the light deflecting liquid crystal cell according to the second embodiment. Having a center 3d as a common center, a plurality of circular (annular) prisms 3a are positioned concentrically, and the prisms in a rotation symmetric shape (isotropic in circle direction of the center 3d) in a plan view are formed. In a cross section in the thickness direction passing through the center 3d, each prism 3a has, for example, the apex angle of 45 degrees, the bottom angle 45 degrees and 90 degrees, a height of 5.2 μm, a bottom length (pitch) of 5.2 μm and a shape of triangle.

In an arbitrary cross section in the thickness direction passing through the center 3d, the prism layer 3 is in a symmetrical shape (bilaterally symmetry) with respect to the center 3d as same as the first embodiment. The prisms on the right of the center 3d have right slanted surfaces whereas the prisms on the left side of the center 3d have left slanted surfaces. The prism 3a positioned at the center is in a conic shape contacting the right slanted surface with the left slanted surface. The formation region of the prism layer 3 is, for example, 60 mm wide and 30 mm long.

Referring to FIG. 1 again, as same as the first embodiment, the prism layer 3, the $SiO_2$ film 33 and the transparent electrode 32 are formed on the glass substrate 31, and the glass substrate 31 is assembled with another glass substrate 11 having the transparent electrode 12 to form a vacant cell.

In the second embodiment of the present invention, the gap controller to be added to the main sealant 16 formed on the glass substrate 31 side is selected so that the height (from the base layer 3b of the prism) of the liquid crystal layer 15 including the height of the prism 3a becomes, for example, 10 μm to 15 μm. For example, the plastic ball with a diameter of 20 μm is used as the gap controller, and the plastic balls are added to the sealant to form the main sealant. For example, the plastic balls with a diameter of 10 μm are used as the gap controller 14 to be sprayed onto the glass substrate 11.

As same as the first embodiment, the liquid crystal layer 15 is formed by vacuum-filling the liquid crystal material to the vacant cell, and the end sealant is applied on the inlet to seal the liquid crystal cell.

The liquid crystal material described in the blow is used in the second embodiment. Mixed liquid crystal containing a 1:1 mixture of fluorinated mixed liquid crystals JC1041-XX (manufactured by Chisso corporation, Δn:0.142) and 4-cyano-4'-pentylbiphenyl (5CB) (manufactured by Merck Ltd., Δn:0.184) is used, and 6 wt % of chiral agent SO-60BA2 is added to the above-described mixed liquid crystal material.

Then, a mixed monomer which is mixture of mono-functional material and bi-functional material is added as a photopolymerization monomer. For example, 2-ethylhexylacrylate (EHA) (manufactured by Sigma-Aldrich Corporation) as the mono-functional material and RM257 (manufactured by Merck Ltd.) as the bi-functional material are mixed with a mole ratio of 50:50.

Further, Irgacure 369 (manufactured by Ciba-Geigy K.K.) is used as a photopolymerization initiator and added to the mixed monomer by 5 wt. % of the mixed monomer.

6 mol % of the photopolymerization mixed monomer added with the photopolymerization initiator is added to the mixed liquid crystal added with the chiral agent. As described in the above, the liquid crystal material which forms the liquid crystal layer 15 is prepared.

When the liquid crystal cell formed as in the above is heated, a blue phase is exhibited in a narrow temperature range around 50 degrees Celsius. The blue phase can be polymer-stabilized by irradiating ultraviolet rays to the liquid crystal cell while keeping the temperature exhibiting the blue phase as same as the first embodiment. The polymer-stabilized liquid crystal cell exhibits the blue phase in a wide temperature range from −5 degrees Celsius to 50 degrees Celsius.

As described in the above, the light deflecting liquid crystal cell according to the second embodiment is fabricated. In the light deflecting liquid crystal cell according to the second embodiment, the refractive index of the liquid crystal layer is changed from the refractive index of the cholesteric blue phase to the refractive index of the homeotropic phase by applying the voltage, and the light deflecting direction by the prism can be changed.

Further, in the light deflecting liquid crystal cell according to the second embodiment, it is expected that the high voltage to exhibit the homeotropic phase is about 50V, the response speed at the rising edge at a room temperature is about 800 μsec and the response speed at the falling edge at a room temperature is about 180 μsec.

Next, the 3D glasses according to the second application example of the light deflecting liquid crystal cell according to the second embodiment are explained. The structure and the operation of the 3D glasses according to the second embodiment are basically the same as the 3D glasses according to the first application example as described with reference to FIG. 5 to FIG. 7B. Hereinafter, only the difference from the first application example is explained.

In the 3D glasses according to the second application example, it is preferable that the centers (rotation symmetry) of the prism layers of the left eye cell and the right eye cell are arranged to match the centers (pupils) of the left eye and the right eye respectively.

In the first application example, the prisms in a shape of bilaterally symmetry to the central axis are used. By those prisms, the eye to which the 3D image is not shown sees the overlapped left and right backgrounds outside the display.

According to the second application example, the prisms (isotropic to the circle direction) which are rotation symmetry to the center are used. By those prisms, the eye to which the 3D image is not shown sees overlapped backgrounds around the display. Therefore, the overlapped backgrounds seen by the eye to which the 3D image is not shown can be more unclear. Further, the ray corresponding to the 3D image is dispersed in all directions around the eye to which the 3D image is not shown.

Further, the shapes of the prism used for the 3D glasses are not limited to the shapes shown in the first and second embodiments. That is, it is not limited to the shapes in line symmetry or in rotation symmetry. When the deflecting direction by the prism is differentiated in in-plane positions, the rays from pluralities of directions can be deflected to the eye direction. Therefore, it makes possible to overlap a plurality of backgrounds to be seen by the eye to which the 3D image is not shown. It is preferable to make background seen by a watcher unclear.

For example, the slant angles of the prisms can be changed depending on the positions. Further, the prism may have a curved surface. For example, the prism can be in a cross sectional shape of a curve such as a sine curve. When these types of the prisms are used, the backgrounds entering to the eye to which the 3D image is not shown become more unclear because the deflecting directions of the rays vary by positions.

Further, the outer shape of the light deflecting liquid crystal cell is not limited to the rectangle but may be a polygonal shape such as pentagon. In this case, deformed cut such as scratching on the cross by a scriber may be performed. Further, corner parts may be chamfered to have roundness.

Moreover, when the liquid crystal layer is formed by an ODF method, curing of the main seal consisting of ultraviolet curable resin and the blue phase polymer stabilization process of the liquid crystal layer can be performed by irradiating ultraviolet rays at the same time. The ultraviolet rays are irradiated all over the cell while heating to the temperature (about 45 degrees Celsius to about 60 degrees Celsius) to exhibit the blue phase.

Furthermore, when using the 3D glasses according to the above-described application example, anything such as a liquid crystal display (LCD), a plasma display panel (PDP), an organic electroluminescence (EL) display, a field emission display (FED), a cathode ray tube (CRT), etc. can be used as a display to display three-dimensional images, and there is no specific limitation.

The present invention has been described in connection with the preferred embodiments. The invention is not limited only to the above embodiments. It is apparent that various modifications, improvements, combinations, and the like can be made by those skilled in the art.

What are claimed are:
1. A light deflecting apparatus, comprising:
   first and second light deflecting liquid crystal cells, arranged to correspond respectively to eyes of a user, and each comprising (i) a liquid crystal layer including liquid crystal molecules with positive dielectric anisotropy and exhibiting a cholesteric blue phase when no voltage is applied, (ii) a pair of transparent substrates facing each other and sandwiching the liquid crystal layer, (iii) a pair of transparent electrodes respectively provided above surfaces of the transparent substrates facing the liquid crystal layer and being configured to apply a voltage to the liquid crystal layer, and (iv) a prism layer formed above the surface of one of the transparent substrates facing the liquid crystal layer; and a driving device that performs a first control for alternately switching between a first state in which a first high voltage is applied to the first light deflecting liquid crystal cell such that the first light deflecting liquid crystal cell is in a homeotropic phase while a second low voltage is applied to the second light deflecting liquid crystal cell such that the second light deflecting liquid crystal cell is in a cholesteric blue phase, and a second state in which a third low voltage is applied to the first light deflecting liquid crystal cell such that the first light deflecting liquid crystal cell is in a cholesteric blue phase while a fourth high voltage is applied to the second light deflecting liquid crystal cell such that the second light deflecting liquid crystal cell is in a homeotropic phase.

2. The light deflecting apparatus according to claim 1, wherein refractive indices of the liquid crystal layer and the prism layer are substantially equal in the homeotropic phase in each of the first and the second light deflecting liquid crystal cells.

3. The light deflecting apparatus according to claim 2, wherein a direction of deflecting an incident ray by the prism changes depending on an in-plane position when the liquid crystal layer exhibits the blue phase in each of the first and the second light deflecting liquid crystal cells.

4. The light deflecting apparatus according to claim 3, wherein the driving device changes at least one of the second and the third voltages time-dependently.

5. The light deflecting apparatus according to claim 3, wherein the prism layer of each of the first and the second light deflecting liquid crystal cells comprises a part having a line-symmetrical shape or a part having a rotation-symmetrical shape.

6. The light deflecting apparatus according to claim 3, wherein the prism layer of each of the first and the second light deflecting liquid crystal cells comprises a prism having a curved surface.

7. The light deflecting apparatus according to claim 3, wherein the driving device further performs a second control in which a high voltage to make the liquid crystal layer exhibit the homeotropic phase is applied to each of the first and the second light deflecting liquid crystal cells when the first control is not performed.

8. The light deflecting apparatus according to claim 3, wherein the cholesteric blue phase is polymer-stabilized by forming a polymer network in a part of the liquid crystal layer of each of the first and the second light deflecting liquid crystal cells.

9. The light deflecting apparatus according to claim 3, wherein one of the pair of the transparent electrodes formed above the substrate having the prism layer is formed above a surface of the prism layer facing the liquid crystal layer in each of the first and the second light deflecting liquid crystal cells.

10. The light deflecting apparatus according to claim 1, wherein a direction of deflecting an incident ray by the prism changes depending on an in-plane position when the liquid crystal layer exhibits the blue phase in each of the first and the second light deflecting liquid crystal cells.

11. The light deflecting apparatus according to claim 1, wherein the driving device changes at least one of the second and the third voltages time-dependently.

12. The light deflecting apparatus according to claim 1, wherein the prism layer of each of the first and the second light deflecting liquid crystal cells comprises a part having a line-symmetrical shape or a part having a rotation-symmetrical shape.

13. The light deflecting apparatus according to claim 1, wherein the prism layer of each of the first and the second light deflecting liquid crystal cells comprises a prism having a curved surface.

14. The light deflecting apparatus according to claim 1, wherein the driving device further performs a second control in which a high voltage to make the liquid crystal layer exhibit the homeotropic phase is applied to each of the first and the second light deflecting liquid crystal cells when the first control is not performed.

15. The light deflecting apparatus according to claim 1, wherein the cholesteric blue phase is polymer-stabilized by forming a polymer network in a part of the liquid crystal layer of each of the first and the second light deflecting liquid crystal cells.

16. The light deflecting apparatus according to claim 1, wherein one of the pair of the transparent electrodes formed above the substrate having the prism layer is formed above a surface of the prism layer facing the liquid crystal layer in each of the first and the second light deflecting liquid crystal cells.

* * * * *